United States Patent [19]
Haviland

[11] 3,791,667
[45] Feb. 12, 1974

[54] RETRACTABLE VEHICLE PASSENGER CUSHIONING SYSTEM

[76] Inventor: Harold R. Haviland, 1038 Latty, Defiance, Ohio 43512

[22] Filed: May 4, 1972

[21] Appl. No.: 250,326

[52] U.S. Cl............................. 280/150 AB, 46/87
[51] Int. Cl. ........................................... B60r 21/08
[58] Field of Search....... 280/150 AB; 46/87, 88, 90

[56] References Cited
UNITED STATES PATENTS

| | | | |
|---|---|---|---|
| 3,617,073 | 11/1971 | Landsman | 280/150 AB |
| 2,899,214 | 8/1959 | D'Antini | 280/150 AB |
| 2,755,125 | 7/1956 | Hodges | 280/150 AB |
| 3,510,150 | 5/1970 | Wilfert | 280/150 AB |
| 3,591,201 | 7/1971 | Brawn et al. | 280/150 AB |

Primary Examiner—David Schonberg
Assistant Examiner—John P. Silverstrim
Attorney, Agent, or Firm—Clarence A. O'Brien; Harvey B. Jacobson

[57] ABSTRACT

A plurality of individually or collectively actuatable air bag restraint devices for disposition both forward of and alongside of each passenger seating area within a vehicle. Each individual device is strategically located to provide the maximum cushioning effect with a minimum of obstruction within the passenger seating area within the associated vehicle. Each air bag restraint device includes a hollow open-sided housing designed for flush or recessed mounting in an associated vehicle body portion and the open side of the housing is covered by a fluid impervious stretchable membrane whereby the discharging of a selected gas under pressure into the housing will cause the membrane to be inflated and expanded outwardly of the open side of the housing to cushion any object moving in a direction toward the housing.

9 Claims, 12 Drawing Figures

PATENTED FEB 12 1974 3,791,667
SHEET 1 OF 2
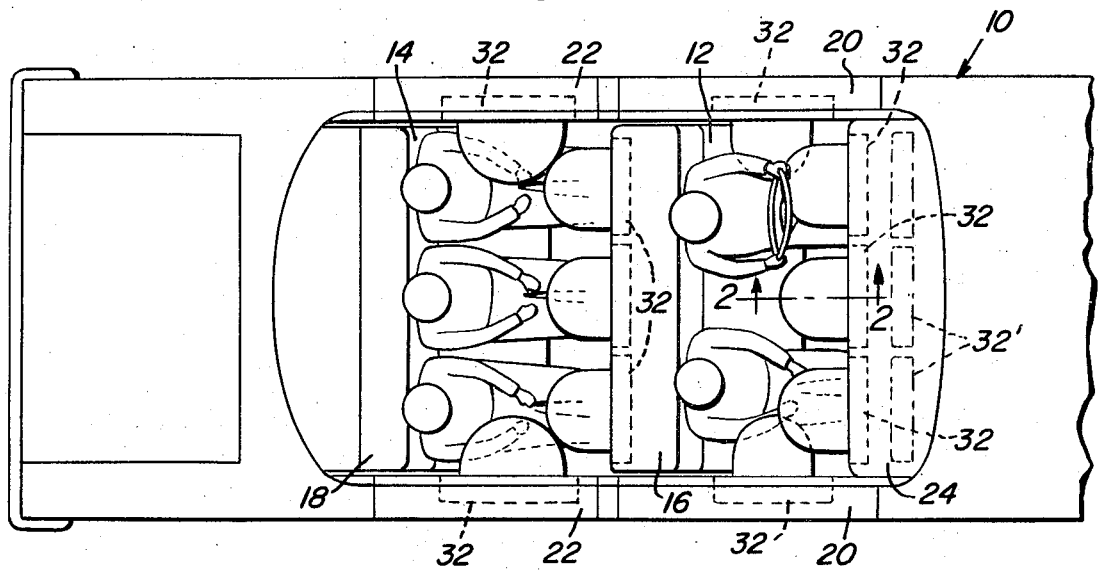
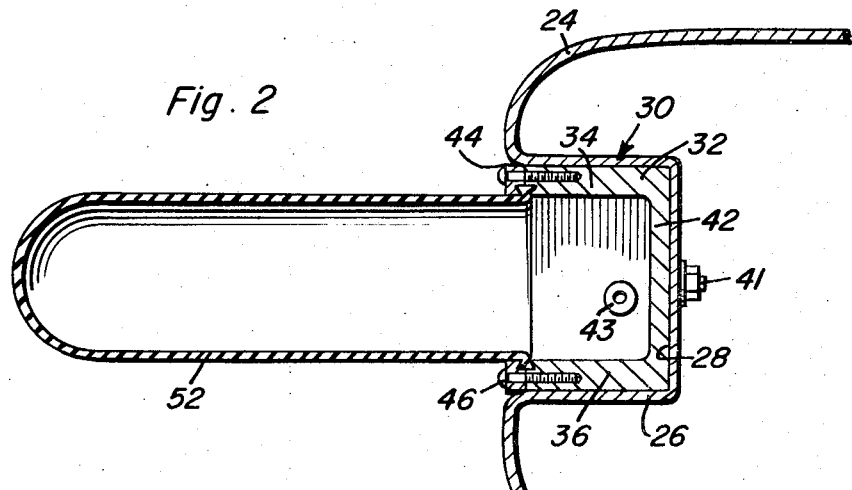
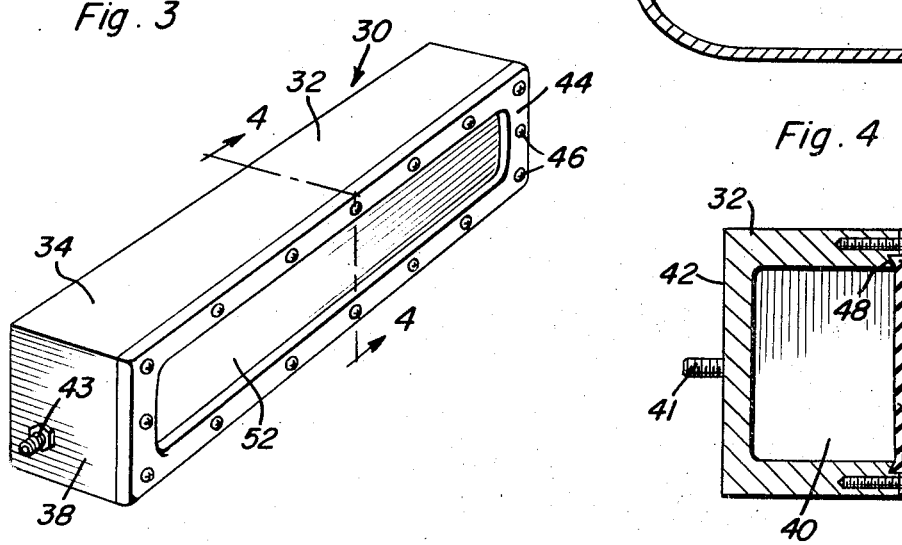
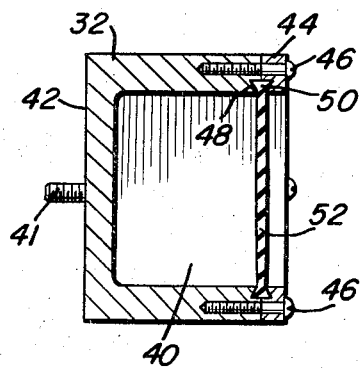

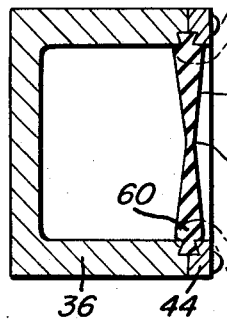
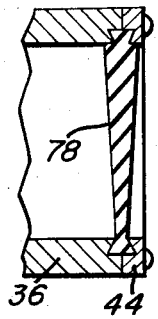
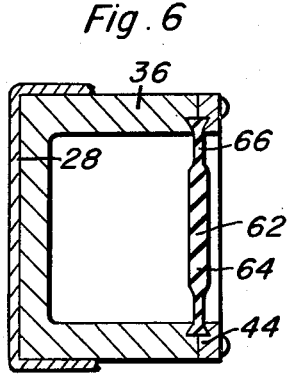
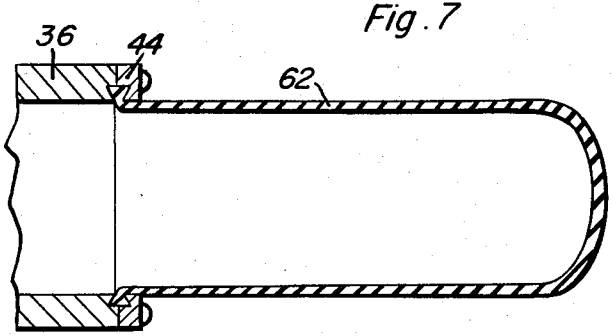
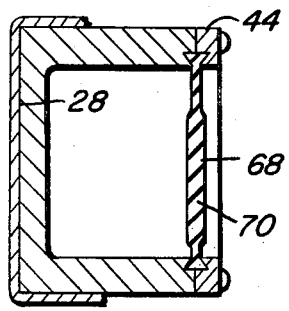
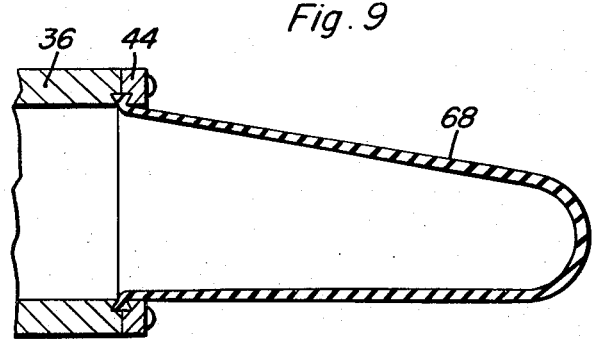
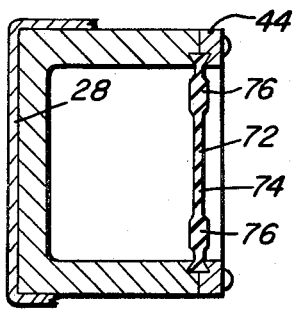
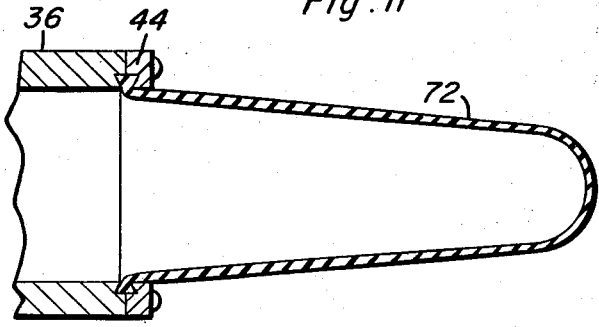

3,791,667

RETRACTABLE VEHICLE PASSENGER CUSHIONING SYSTEM

The passenger cushioning system of the instant invention has been specifically designed to provide a structure of limited depth that may be readily recessed into various vehicle body portions and which therefore need not require extensive body modifications to be accommodated and enable the cushioning system to be readily adapted for use in substantially all vehicles.

In the past air bag restraint devices have involved complexly folded air-impervious bags and also bulky bag enclosing and ejecting structure which results in a bulky and complex apparatus that may not be readily mounted in a recessed position within existing vehicle body portions. In addition, previous air bag restraint devices have not been readily retractable to their original position for subsequent use after having been once actuated.

It is accordingly the main object of this invention to provide a passenger cushioning system incorporating a plurality of strategically located inflatable passenger restraint devices of reduced bulk that may be readily mounted in recessed positions within various vehicle body portions.

Another object of this invention is to provide a passenger cushioning system of the air bag type constructed in a manner whereby the usual air bag portion thereof is replaced by a stretchable fluid-impervious membrane in order that the membrane may quickly reassume its stored condition after having once been actuated upon deactuation of the cushioning system thereby enabling the cushioning system to be subsequently actuated without excessive maintenance.

Still another object of this invention is to provide a vehicle passenger cushioning system of the expandable membrane type wherein the membrane is of a soft shock-absorbing material to cushion impact, and wherein the membrane portions thereof may be variously formed so as to assume different shapes when inflated.

A final object of this invention to be specifically enumerated herein is to provide a passenger cushioning system in accordance with the preceding objects and which will conform to conventional forms of manufacture, by of simple construction and easy to install so as to provide a device that will be economically feasible, long lasting and trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a fragmentary top plan view of a conventional form of passenger type motor vehicle with the top thereof removed and a plurality of the individual units of the passenger cushioning system of the instant invention strategically located in front of and to the sides of the front and rear passenger seating areas of the vehicle;

FIG. 2 is an enlarged fragmentary vertical sectional view taken substantially upon the plane indicated by the section line 2—2 of FIG. 1 and illustrating the manner in which the membrane portion of one of the units may be expanded to form a passenger restraint member of particular shape;

FIG. 3 is a perspective view of the unit of the instant invention illustrated in FIG. 2;

FIG. 4 is an enlarged vertical sectional view taken substantially upon the plane indicated by the section line 4—4 of FIG. 3;

FIG. 5 is a view similar to FIG. 2 but illustrating a modified form of membrane;

FIGS. 6 and 7 are views similar to FIG. 5 but of a second modified form of membrane with the membrane illustrated in its retracted position in FIG. 6 and in its expanded position in FIG. 7;

FIGS. 8 and 9 are views similar to FIGS. 6 and 7 but illustrating a third modified form of membrane;

FIGS. 10 and 11 are views similar to FIGS. 6 and 7 but illustrating a fourth modified form of membrane; and FIG. 12 is a fragmentary sectional view similar to FIG. 5 but illustrating a fifth modified form of membrane.

Referring now more specifically to the drawings, the numeral 10 generally designates a conventional form of motor vehicle including interior front and rear passenger compartments 12 and 14. A front seat assembly 16 is disposed in the front compartment 12 and a rear seat assembly 18 is disposed in the rear compartment 14. In addition, the vehicle 10 includes a pair of opposite side front doors 20 as well as a pair of opposite side rear doors 22.

With attention now invited more specifically to FIGS. 1 and 2 of the drawings it may be seen that the front passenger compartment 12 includes a transverse dashboard 24 including three recessed portions 26 spaced therealong defining outwardly opening recesses 28.

A restraint unit is referred to in general by the reference numeral 30 and includes an elongated hollow housing 32 defined by top and bottom walls 34 and 36, opposite end walls 38 and 40 and a rear wall 42. The forward side of the housing 30 is open and the housing is snugly seated within one of the corresponding recesses 28 and secured in position by means of fastener means 41. The end wall 38 has a pressurized gas inlet fitting 43 secured therethrough and adapted to be communicated with any suitable controllable source of gas under pressure.

The front of the housing 32 has a removable frame 44 secured thereover by means of fasteners 46 and the confronting portions of the frame 44 and wall portions of the housing 32 coact to define a dovetailed groove 48 extending about the open front side of the housing 32 and in which the marginal portions 50 of a fluid-impervious and stretchable membrane 52 are anchored.

It may be seen from FIG. 1 of the drawings that three of the housings 32 are recessed within the dashboard 24. In addition, four further housings 32 are recessed in the doors 20 and 22 and a second set of three housings 32 are recessed within the back of the seat assembly 16.

Upon actuation of an inertia or impact-actuated control mechanism suitable fluid under pressure such as a gas is ducted into the housings 32 through the fittings 42 whereby the membranes 52 will be expanded from the positions thereof illustrated in FIG. 4 of the drawings to the outwardly projecting passenger cushioning position illustrated in FIG. 2.

With attention invited to FIG. 4 of the drawings, it may be seen that the mid-portion of the membrane 52 is slightly thicker than the marginal portions thereof and accordingly, when the membrane 52 is expanded in the manner illustrated in FIG. 2 of the drawings the membrane 52 is expanded in a manner so as to project outwardly from the housing 32 approximately three times the height of the membrane 52.

However, with attention invited more specifically to FIG. 5 of the drawings, it may be seen that a second form of membrane 56 has a narrow or thin zone 58 extending along its mid-portion and includes relatively thick outer peripheral portions 60. In this manner, when the membrane 56 is expanded, it will assume the generally cylindrical configuration 58' illustrated in phantom lines in FIG. 5.

In FIG. 6 of the drawings there may be seen still another form of membrane 62 having a relatively thick center portion 64 and thinner marginal portions 66 whereby the membrane 62, when expanded, will be shaped in the manner illustrated in FIG. 7 of the drawings. Of course, the similarity between the membranes 52 and 62 may be readily appreciated.

With attention now invited more specifically to FIG. 8 of the drawings, there may be seen a membrane 68 which is similar to the membrane 62 but whose thickened central portion 70 is disclosed closer to the lower marginal portion of the membrane 68 and spaced further from the upper marginal portion of the membrane 68. When the membrane 68 is expanded, it will assume the slightly downwardly deflected condition illustrated in FIG. 9.

From FIG. 10 of the drawings there may be seen a fourth modified form of membrane referred to by the reference numeral 72 and which includes a thin relatively wide central portion 74 and relatively thick outer marginal portion 76 whereby the membrane 72 will assume the configuration thereof illustrated in FIG. 11 when inflated.

From FIG. 12 of the drawings there may be seen a fifth modified form of membrane 78 which tapers in thickness from its upper marginal edge portion toward its lower marginal edge portion. Of course, the membrane 78, when expanded, will assume an outward and upwardly curving configuration and thus the membrane 78 would be well suited for mounting on a lower dashboard portion or beneath the lower marginal edge portion of an associated dashboard.

In FIG. 1 of the drawings an alternate position for mounting the housings 32 is designated by phantom lines as at 32'. In this instance, the housings 32' may be mounted on top of the upper surface of the dashboard 24 and the membrane utilized may be either in the form of the membrane 68 or the membrane 78, when inverted.

Inasmuch as the membranes 52, 58, 62, 68, 72 and 78 are constructed of fluid-impervious stretchable material, after the membranes have once been inflated and the inflation pressure has been released, the membranes will again return to their original positions in readiness for subsequent actuation. Further, if suitable modifications are provided for ducting the pressurized gases into the various housings, the housings may be even further reduced in thickness so as to be still more readily recessible within existing body portions.

Of course, the restraint unit 30 may be utilized in many different types of vehicles such as planes, boats, buses and trucks, etc. for the purpose of cushioning passengers as well as the drivers of these vehicles. Further, the housings 32 may be of any desired cross-sectional shape so as to be readily adaptable for mounting in the associated vehicle as space permits. Also, other shapes of inflated membranes may be utilized by varying the thickness of the membranes throughout specific areas thereof. In this manner, a membrane to be inflated to a particular shape, within limits, may be provided for a specific application.

In addition, the housings 32 may be recessed or flush mounted as desired and the size of the inflated membrane may be varied by controlling the amount of fluid under pressure utilized to inflate the membrane.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An occupant restraint system for a vehicle including an occupant receiving area bound at its forward extremity by a first vehicle body portion and on its opposite sides by means of second and third vehicle body portions, said system including individual occupant restraint assemblies recessed in said body portions so as to be generally flush with the surfaces of said body portions facing into said area, each of said assemblies including an opensided housing opening into said area, an upstanding flexible elastic membrane of fluid-impervious material secured over each housing open side and having its peripheral edges sealingly secured relative to said housing, each of said housings including means for admitting gas under pressure thereinto, and each of said membranes including specific areas thereof of different thickness and other areas thereof extending between said specific areas and which taper in thickness from the specific area of greater thickness to the specific area of lesser thickness.

2. The combination of claim 1 wherein said housings and the open sides thereof are horizontally elongated.

3. The combination of claim 2 wherein said membranes are of substantially constant thickness throughout a major pottion of their central areas and are tapered slightly toward their marginal edges.

4. The combination of claim 1 wherein at least one of said membranes includes relatively thick marginal edge portions and tapers in thickness toward the center thereof.

5. The combination of claim 1 wherein at least one of said membranes includes a central area of relatively great thickness and a peripherally extending zone of lesser thickness.

6. The combination of claim 5 wherein said central zone of relatively great thickness is spaced closer to one marginal portion of said membrane than the opposite marginal portion thereof.

7. The combination of claim 1 wherein at least one of said membranes includes a central area of relatively little thickness and a surrounding peripheral zone of greater thickness.

8. The combination of claim 1 wherein at least one of said membranes tapers in thickness from one marginal edge portion thereof toward the other marginal edge portion thereof.

9. An occupant restraint assembly to be recessed within a vehicle body portion facing into an occupant receiving area of a vehicle, said assembly including an open-sided housing, an upstanding flexible elastic membrane secured over the open side of said housing and having its peripheral edges sealingly secured relative to said housing, said housing including means for admitting gas under pressure thereinto behind said membrane, said membrane including a first area thereof which is of a first thickness and a second area thereof which is a second lesser thickness, said membrane including a third area thereof extending between said first and second areas and which tapers in thickness from said first area toward said second area.

* * * * *